May 31, 1960 R. C. P. HINTON ET AL 2,938,956
PARTY LINE DETECTOR SYSTEM
Filed July 2, 1956
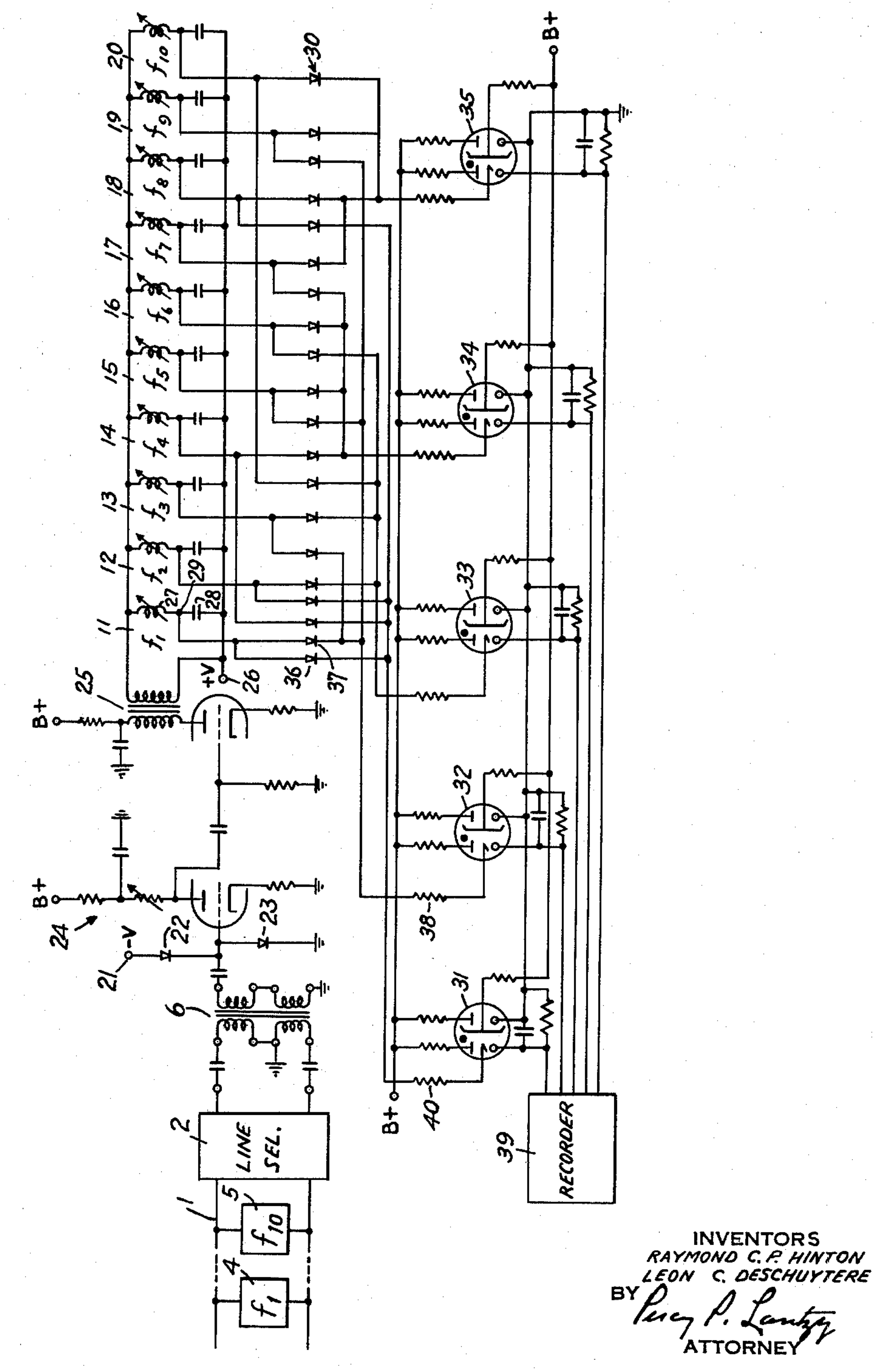
INVENTORS
RAYMOND C. P. HINTON
LEON C. DESCHUYTERE
BY Percy P. Lantzy
ATTORNEY

United States Patent Office

2,938,956

Patented May 31, 1960

2,938,956

PARTY LINE DETECTOR SYSTEM

Raymond C. P. Hinton, Teaneck, and Leon C. Deschuytere, Nutley, N.J., assignors to International Telephone and Telegraph Corporation, Nutley, N.J., a corporation of Maryland

Filed July 2, 1956, Ser. No. 595,486

8 Claims. (Cl. 179—17)

This invention relates to automatic telephone systems and more particularly to the provision for identification of party stations making calls over party lines for the purpose of recording such calls.

One of the objects of this invention is to provide means at the telephone exchange to identify frequency signals generated at the party station making a call and to convert the frequency signal into a code signal for recording purposes; and another object is to provide identifying and signal converting circuitry for such systems which avoids imposing an attenuating load on the frequency signal detection portion thereof at least until identification is established.

A feature of this invention is the provision of a party station detector circuit at the telephone exchange which comprises a plurality of bandpass filters each responsive to the frequency signal of a corresponding party station on a party line. These filters are coupled in parallel to the party line when a call is made over a party line so as to identify the particular party making the call. Connected to the filters is a matrix of semiconductors connected in an arrangement such that when a filter passes a frequency signal this frequency signal is converted to a D.C. potential for application to one or more gas tubes, the outputs of which are applied to a recorder. Where a party line has ten parties, a corresponding number of filters is provided. In the preferred embodiment five gas tubes are provided and the matrix arrangement connects each filter to two of these tubes so that the conversion of each frequency signal provides a "two out of five" code signal. One of the important features of the invention is the provision of a common biasing potential which is coupled to the filter circuits and which acts in conjunction with the frequency signal to provide sufficient triggering potential for the gas tubes to which the filters are coupled. This biasing arrangement is such that the filter circuit is free of attenuation until a gas tube conducts and the loading effect of a conducting gas tube is limited by a suitable limiting resistor. In addition, the incoming signal from a party line is limited at the input to the filters so as to minimize the effect of transient conditions, such for example, as may occur during a dialing operation at the party station.

The above and other objects and features of this invention will be readily apparent from the following description and the accompanying drawing in which the sole figure illustrates schematically the identification and conversion circuit of this invention.

Referring to the drawing, a party line 1 is shown coupled to the selector facilities 2 of a telephone exchange. The party line 1 in indicated as a ten party line having ten party stations, as indicated by the two stations 4 and 5, the identifying signals of which range from $f_1$ to $f_{10}$. When a call is initiated by one of these party stations the selector equipment 2 connects the party line to the called party in the usual manner and if the call is a distant call connections are made over a suitable trunk line.

The line selecting equipment also connects the party line through transformer 6 to the party station identifying and conversion circuit illustrated.

It will be understood that each party station is provided with means to generate a characteristic frequency identifying that station when a call is initiated. A suitable frequency identifying generator for this purpose is illustrated in the copending application of W. Hatton, Serial No. 451,791, filed August 24, 1954.

The frequency signal detecting circuit of this invention includes a plurality of bandpass filters 11 through 20 which are designed to pass frequency signals $f_1$–$f_{10}$, respectively. The signal is applied to the filters in parallel through a limiting device comprising a source of negative potential, such as one volt at 21, which is connected through a diode 22 to the line and a second diode 23 connecting the line to ground. This signal limiter limits the incoming frequency signal to a desired input voltage for the amplifier circuit 24. The output of the amplifier circuit is applied through transformer 25 to the filters 11–20. Also applied to the filter circuits in common is a positive biasing voltage at 26. Each of the filters comprises a series-coupled inductance-capacitance circuit 27—28 and the output thereof is coupled at the junction 29, as illustrated.

The conversion portion of the invention comprises a matrix of semiconductors 30 connected in such a way with respect to the filters and five gas tubes 31, 32, 33, 34 and 35, that two of these gas tubes are caused to conduct when a frequency signal is passed by one of the filters. By way of example, filter 11 is coupled through semiconductors 36 and 37 to the controlling grids of tubes 31 and 32. The coupling relationship for the other filters is set forth in the following table of the identification code. This table indicates the weighted values 0, 1, 2, 4, and 8 for the tubes 31, 32, 33, 34 and 35, respectively.

*Identification codes*

| Tubes | 31 | 32 | 33 | 34 | 35 |
|---|---|---|---|---|---|
| Values | 0 | 1 | 2 | 4 | 8 |
| Freq. Signal: | | | | | |
| $f_1$ | x | x | | | |
| $f_2$ | x | | x | | |
| $f_3$ | | x | x | | |
| $f_4$ | x | | | x | |
| $f_5$ | | x | | x | |
| $f_6$ | | | x | x | |
| $f_7$ | | | | x | x |
| $f_8$ | x | | | | x |
| $f_9$ | | x | | | x |
| $f_{10}$ | | | x | | x |

It will be noted that for each of the frequencies $f_1$ through $f_{10}$ two only of the tubes are rendered conductive. The values correspond with the subscripts of the frequency signals except for $f_7$. The value for this frequency signal is 12 but insofar as identification is concerned such value is acceptable. This "two out of five" code signal is utilizable for recording purposes on recorder 39 which may comprise a magnetic tape or drum or any other medium by which code signals are readily registered or recorded. The "two out of five" code also provides for checking for proper identification since less than two or more than two code digits is an indication of an erroneous identification and the telephone exchange equipment is arranged (not shown) to cancel such an erroneous indication and attempt a new identification of the calling party.

In circuits heretofore attempted for the purpose of identifying and converting party station signals, a biasing voltage is applied together with some form of loading means. Such loading means normally attenuate the responsiveness of the filter thereby necessitating a high biasing potential. The tubes 31 to 35 comprise, preferably, high speed cold cathode tubes, a suitable type being G1–371K. This type of tube requires about 180 volts to fire. When a load such as heretofore believed necessary was imposed on the circuit a biasing voltage of 130 volts in conjunction with a 70-volt signal was required to provide a total desired triggering voltage of approximately 200 volts. By connecting the bias voltage at 26 in the manner illustrated and without the presence of any loading resistor it was found that for the same input signals as in the prior art instead of obtaining a signal voltage of 70 a signal voltage of approximately 100 volts was obtained. Thus the biasing voltage was reduced from 130 volts to 100 volts and satisfactory operation was obtainable. By our present circuit the filter is free of any actual load attenuation because the biasing voltage is applied as a reference voltage to the filter. In the prior art the filter was held at ground and the input signal had to swing on either side of ground. In order for the signal voltage to be effectively applied to the grid in order to accomplish triggering of a gas tube, there had to be a load provided, across which the signal could be applied, to develop a large enough voltage to fire the tube. This load was usually a resistor connected in parallel with the filter and tied to a biasing voltage of some value, for instance, 130 volts. An additional 70 volts was developed by the signal to apply 200 volts to the grid of the gas tube causing it to fire. Since the resistor in parallel was tied to 130 volts at one end and ground at the filter, there was provided an A.C. circuit. The A.C. circuit would see two different impedances, respectively, during each half of the A.C. cycle due to the difference of impedance of the rectifiers in the forward and reverse directions. This, of course, presented an unbalance loading problem. In order to provide some symmetrical loading, a dummy load had to be added to the circuit. The circuit with the two loads, the biasing load and the dummy load not only reduce the amplitude of the signal, but also reduce its selectively by lowering the Q. This entire circuit is eliminated by the present inventive circuit by tying the biasing voltage necessary for the tube to the filter output. When the trigger signal is applied, the output of the filter becomes sufficient to fire the tube. The non-attenuation continues until a frequency signal is identified by the firing of the associated gas tubes. As soon as a tube fires a load as seen by the limiting resistance in the grid circuit is thereby imposed on the filtering circuit. This load however is limited by resistors 40, 38, etc., as the case may be, and has no adverse effect on any other tube to which the filter may be coupled. By conduction of the two tubes coupled to a filter the identification becomes complete. The margin between the combined potential of 200 volts and the normally required triggering potential of 180 volts insures operation of both tubes even though one may fire ahead of the other.

While we have described above the principles of our invention in connection with specific apparatus, it is to be clearly understood that this description is made only by way of example and not as a limitation to the scope of our invention as set forth in the objects thereof and in the accompanying claims.

We claim:

1. A party line identification circuit comprising a serially coupled condenser and coil forming a bandpass filter adapted to pass a given identifying frequency signal, a source of D.C. voltage coupled to said filter, a plurality of devices adapted to be rendered conducting in response to the combined output of said filter and said source, and coding means, including a pair of rectifiers constituting a network coupling said filter to a pair of said devices, for converting a selected frequency signal upon firing of said devices, to a self-checking code signal.

2. In a telephone system in which at least one line has a plurality of party stations thereon, each party station having means to apply a single identifying frequency signal to said line to identify a station initiating a call; a telephone exchange having a party station detector circuit comprising a plurality of bandpass filters coupled in parallel, each of said filters being responsive to the frequency signal of a corresponding one of said party stations, a D.C. voltage source coupled in common to said filters, a self-checking coding circuit for converting each selected frequency signal to a code representation having a plurality of devices each adapted to be rendered conductive in response to the combined output of one of said filters and said common source, and means coupling said filters to selected ones of said devices for application thereto of the combined output of one of said filters and said common source, said combined output being free of attenuation until one of said devices is rendered conductive and means in said coupling means to limit the load effect of a conducting device.

3. In a telephone system in which at least one line has a plurality of party stations thereon, each party station having means to apply a single identifying frequency signal to said line to identify a station initiating a call; a telephone exchange having a party station detector circuit comprising a plurality of bandpass filters coupled in parallel, each of said filters being responsive to the frequency signal of a corresponding one of said party stations, a D.C. voltage source coupled in common to said filters, a self-checking coding circuit for converting each selected frequency signal to a code representation having a plurality of devices each adapted to be rendered conductive in response to the combined output of one of said filters and said common source, a matrix of semiconductors, and means coupling each of said filters through said matrix to one or more of said devices, said combined outputs being free of attenuation until one of said devices is rendered conductive, and means in said coupling means to limit the load effect of a conducting device on the filters coupled thereto.

4. In a telephone system in which at least one line has a plurality of party stations thereon, each party station having means to apply a single identifying frequency signal to said line to identify a station initiating a call; a telephone exchange having a party station detector circuit comprising a plurality of bandpass filters coupled in parallel, each of said filters being responsive to the frequency signal of a corresponding one of said party stations, a D.C. voltage source coupled in common to said filters, a self-checking coding circuit for converting each selected frequency signal to a code representation having half as many devices as said filters, each said device being adapted to be rendered conductive in response to the combined output of one of said filters and said common source, a matrix of semiconductors coupling each of said filters to two of said devices, said matrix having associated therewith means to limit the load effect of a conducting device on the filters coupled thereto.

5. In a telephone system in which at least one line has a plurality of party stations thereon, each party station having means to apply a single identifying frequency signal to said line to identify a station initiating a call; a telephone exchange having a party station detector circuit comprising a plurality of bandpass filters coupled in parallel, each of said filters being responsive to the frequency signal of a corresponding one of said party stations, means limiting the amplitude of frequency signals applied to said filters, a D.C. voltage source coupled in common to said filters, a two out of five coding circuits for converting each selected frequency signal to a binary representation circuit having a plurality of devices each adapted to be rendered conductive in response to the combined output of one of said filters and said common source, and means coupling said filters to selected ones of said devices for application thereto of the combined output of one of said filters and said common source, said combined output being free of attenuation until one of said devices is rendered conductive and means in said coupling means to limit the load effect of a conducting device on the filters coupled thereto.

6. A party line identification circuit comprising a serially coupled condenser and coil forming a bandpass filter adapted to pass a given identifying frequency signal, a source of D.C. voltage, a device adapted to be rendered conducting in response to the combined output of said filter and said source, means coupling said source to said filter to provide a reference potential at said filter output, and a pair of diodes constituting a network for coding a selected frequency signal coupling said filter to said device for combined application of said reference voltage and said filter output to said device, said diode network in conjunction with said coupling means being arranged to maintain said filter free from attenuation until said device conducts.

7. A party line identification circuit comprising a serially coupled condenser and coil forming a bandpass filter adapted to pass a given identifying frequency signal, a source of D.C. voltage, a device adapted to be rendered conductive in response to the combined output of said filter of said source, means coupling said source to said filter to provide a reference potential at said filter output, a pair of diodes constituting a network for coding a selected frequency signal coupling said filter to said device for combined application of said reference potential and said filter output, said diode network in conjunction with said coupling means being arranged to maintain said filter free of attenuation until said device conducts, and a limiting resistance included in said diode network to limit the load effect of said device when said device conducts.

8. A party line identification circuit comprising a serially coupled condenser and coil forming a bandpass filter adapted to pass a given identifying frequency signal, a source of D.C. voltage, a pair of gaseous discharge tubes for providing self-checking coding adapted to be rendered conductive in response to the combined output of said filter and said source, means coupling said source to said filter to provide a reference potential at said filter output, and a series coupled rectifier and resistor coupling said filter to said device in a manner free of attenuation to said filter until said device conducts, said resistor operating to limit the load effect of said device when said device conducts.

References Cited in the file of this patent

UNITED STATES PATENTS

| | | |
|---|---|---|
| 2,237,742 | Lundstrom | Apr. 8, 1941 |
| 2,277,228 | Hecht | Mar. 24, 1942 |
| 2,283,610 | Mohr | May 19, 1942 |
| 2,320,081 | Holden | May 25, 1943 |
| 2,849,538 | Koehler | Aug. 26, 1958 |